United States Patent [19]

Ito

[11] Patent Number: 5,970,179
[45] Date of Patent: Oct. 19, 1999

[54] METHOD OF AND APPARATUS FOR FILTERING IMAGE

[75] Inventor: Wataru Ito, Kanagawa-ken, Japan

[73] Assignee: Fuji Photo Film Co., Ltd., Kanagawa-Ken, Japan

[21] Appl. No.: 08/912,339

[22] Filed: Aug. 18, 1997

[30] Foreign Application Priority Data

Aug. 16, 1996 [JP] Japan .................................... 8-216361

[51] Int. Cl.$^6$ .............................. G06K 9/40; G06T 5/00
[52] U.S. Cl. ........................... 382/261; 382/266; 382/275
[58] Field of Search .................................... 382/261, 260, 382/266, 269, 272, 254, 300, 299, 275; 358/447; 347/15, 43

[56] References Cited

U.S. PATENT DOCUMENTS

| 5,454,052 | 9/1995 | Kojima ..................................... 382/266 |
| 5,754,710 | 5/1998 | Sekine et al. ........................... 382/300 |
| 5,796,878 | 8/1998 | Nakayama et al. ..................... 382/300 |

FOREIGN PATENT DOCUMENTS

| 0 753 828 | 1/1997 | European Pat. Off. .......... G06T 3/40 |
| 2-13910 | 1/1990 | Japan ............................... G02B 6/36 |

*Primary Examiner*—Scott Rogers
*Attorney, Agent, or Firm*—Sughrue, Mion, Zinn, Macpeak & Seas, PLLC

[57] ABSTRACT

In a method of image filtering for carrying out picture element interpolation on a digital image signal obtained by sampling at a predetermined density an image signal representing an original image, the number of image signal components of the digital image signal is increased by interpolating, into the digital image signal, image signal components whose values are obtained on the basis of a predetermined operation using values of all the picture elements within the area covered with a filter and the coefficient of the filter corresponding to each of the picture elements. When an edge portion exists in the area covered with the filter, the predetermined operation is carried out after the image signal components for the picture elements representing the edge portion are corrected.

10 Claims, 5 Drawing Sheets

FIG.3

| A00 | A01 | A02 | A03 | A04 B04 | A05 | A06 | A07 | A08 | A09 |
|-----|-----|-----|-----|---------|-----|-----|-----|-----|-----|
| ●   | ●   | ●   | ●   | ● ○     | ●   | ●   | ●   | ●   | ●   |
| A10 | A11 | A12 | A13 | A14 B14 | A15 | A16 | A17 | A18 | A19 |
| ●   | ●   | ●   | ●   | ● ○     | ●   | ●   | ●   | ●   | ●   |
| A20 | A21 | A22 | A23 | A24 B24 | A25 | A26 | A27 | A28 | A29 |
| ●   | ●   | ●   | ●   | ● ○     | ●   | ●   | ●   | ●   | ●   |
| A30 | A31 | A32 | A33 | A34 B34 | A35 | A36 | A37 | A38 | A39 |
| ●   | ●   | ●   | ●   | ● ○     | ●   | ●   | ●   | ●   | ●   |
| A40 | A41 | A42 | A43 | A44 B44 | A45 | A46 | A47 | A48 | A49 |
| ●   | ●   | ●   | ●   | ● ○     | ●   | ●   | ●   | ●   | ●   |
|     |     |     |     | C44 D44 |     |     |     |     |     |
| A50 | A51 | A52 | A53 | A54 B54 | A55 | A56 | A57 | A58 | A59 |
| ●   | ●   | ●   | ●   | ● ○     | ●   | ●   | ●   | ●   | ●   |
| A60 | A61 | A62 | A63 | A64 B64 | A65 | A66 | A67 | A68 | A69 |
| ●   | ●   | ●   | ●   | ● ○     | ●   | ●   | ●   | ●   | ●   |
| A70 | A71 | A72 | A73 | A74 B74 | A75 | A76 | A77 | A78 | A79 |
| ●   | ●   | ●   | ●   | ● ○     | ●   | ●   | ●   | ●   | ●   |
| A80 | A81 | A82 | A83 | A84 B84 | A85 | A86 | A87 | A88 | A89 |
| ●   | ●   | ●   | ●   | ● ○     | ●   | ●   | ●   | ●   | ●   |
| A90 | A91 | A92 | A93 | A94 B94 | A95 | A96 | A97 | A98 | A99 |
| ●   | ●   | ●   | ●   | ● ○     | ●   | ●   | ●   | ●   | ●   |

F

| K0 | K1 | K2 | K3 | K4 | K5 | K6 | K7 | K8 | K9 |
|----|----|----|----|----|----|----|----|----|----|

- ● SAMPLING POINT
- ○ INTERPOLATED POINT  $Bm4 = \sum_{i=0}^{9} Ki \times \langle Ami \rangle$  (a)
- ◍ INTERPOLATED POINT  $C44 = \sum_{i=0}^{9} Ki \times \langle Ai4 \rangle$  (b)
- ◉ INTERPOLATED POINT  $D44 = \sum_{i=0}^{9} Ki \times \langle Bi4 \rangle$  (c)

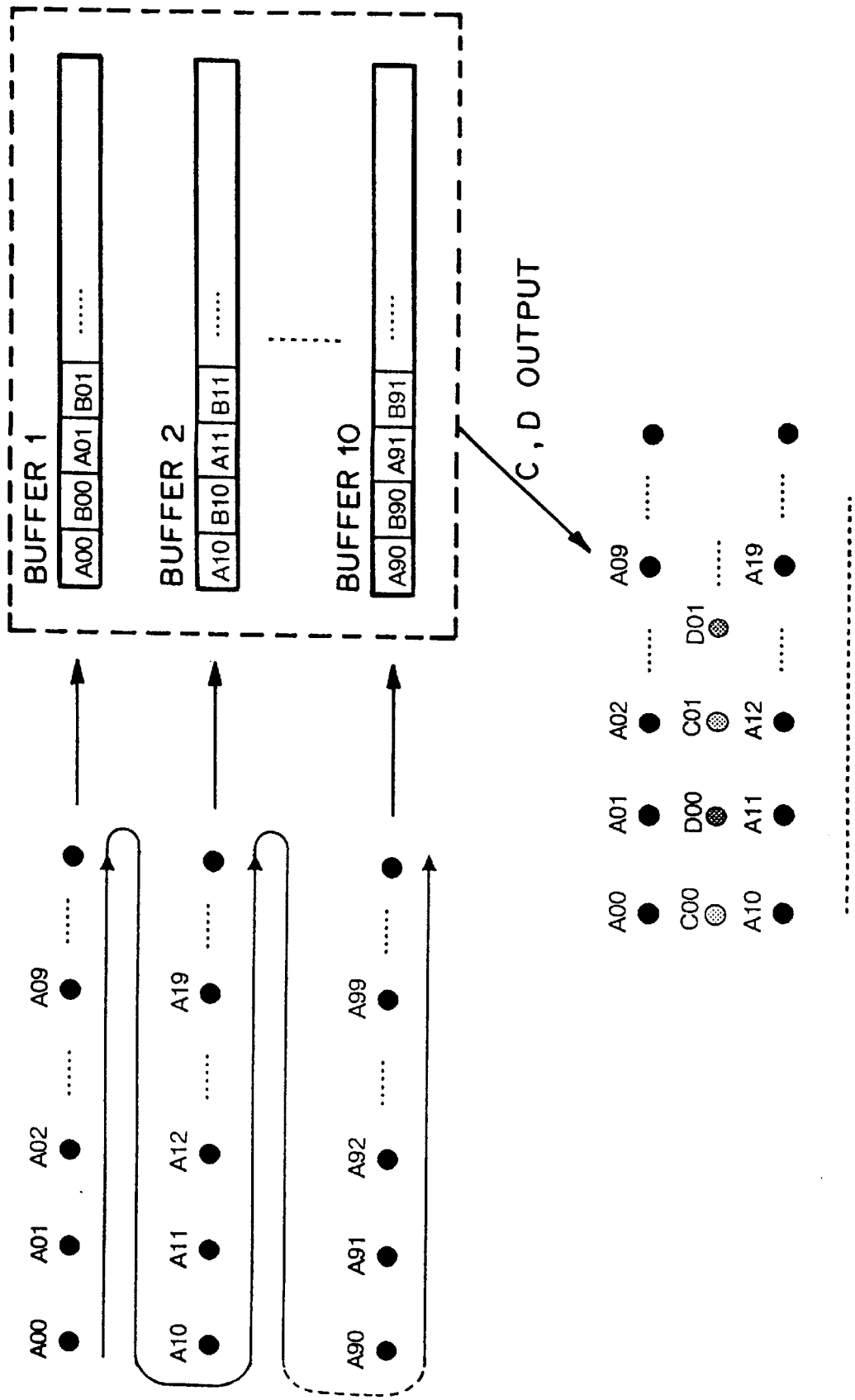

METHOD OF AND APPARATUS FOR FILTERING IMAGE

BACKGROUND OF THE INVENTION

1. Field of the Invention

This invention relates to a method of and an apparatus for filtering an image, and more particularly to those for carrying out an image filtering in which an interpolation processing is carried out to increase the number of image signal components of a digital image signal.

2. Description of the Related Art

There have been known image recording apparatus such as laser printers, thermal printers and the like for recording a digital image in an actual size or to an enlarged or reduced scale. In such an image recording apparatus, a digital image signal obtained by sampling an analog image signal is subjected to a predetermined image processing, as required, for instance, to an interpolation processing in the case where the image is to be enlarged and then reproduced on an image recording medium.

When the density of the picture elements of the image signal is changed as disclosed, for instance, in Japanese Unexamined Patent Publication No. 2(1990)-13910, EP 753828 A2, U.S. Ser. No. 08/823,312 and/or the response of the image is adjusted as disclosed in U.S. Ser. No. 08/406, 076 in order to reproduce an image more faithful to the original on the basis of an image signal obtained by sampling, a filtering processing is generally carried out on the image signal.

In such a filtering process the number of image signal components is increased by interpolation of values obtained by convolution integration using values of all the picture elements within the filter size (within the area covered with the filter) and the coefficient of the filter corresponding to each of the picture elements for the purpose of interpolation enlargement of the image or changing the density of picture elements.

Conventionally the convolution integration is carried out according to the following operation expression.

$$b = \sum_{i=0}^{9} K_i x a_i \quad (1)$$

The expression (1) is inclined to set the values of the interpolated picture elements so that continuity between the picture elements becomes smooth.

In the case where an analog image is read out by a scanner or the like, continuity of the image is high due to band limitation. To the contrast, when letters or patterns are inserted into a digital image, a discontinuous part or an edge appears in the image since band limitation is not effected. When such an edge is within the filter size, ringing artifact appears near the edge when the values of the interpolated picture elements are set by the convolution integration having the aforesaid inclination.

For example, when interpolation is carried out on an image signal made up of picture elements (sampling points on the original) whose values (values of image signal components representing the picture elements) are as shown by black dots (●) in FIG. 6A, it is ideal that the interpolated picture elements have values falling on the dotted line in FIG. 6A. However when the values of the interpolated picture elements are determined according to the aforesaid operation expression, the interpolated picture elements have values represented by white dots (○) in FIG. 6B and the output fluctuates to cause ringing.

SUMMARY OF THE INVENTION

In view of the foregoing observations and description, the primary object of the present invention is to provide a method of and an apparatus for filtering an image which can carry out picture element interpolation without causing ringing even if an edge portion is included in the filter size.

The method of image filtering of the present invention is for carrying out picture element interpolation on a digital image signal obtained by sampling at a predetermined density an image signal representing an original image, wherein the number of image signal components of the digital image signal is increased by interpolating, into the digital image signal, image signal components whose values are obtained on the basis of a predetermined operation using values of all the picture elements within the area covered with a filter and the coefficient of the filter corresponding to each of the picture elements, and is characterized in that when an edge portion exists in the area covered with the filter, said predetermined operation is carried out after the image signal components for the picture elements representing the edge portion are corrected.

The method of image filtering may comprise a step of detecting existence of an edge portion. For example, existence of an edge portion can be detected by comparing the absolute value of the difference between the values of image signal components for adjacent picture elements in the area covered with the filter with a predetermined threshold value, or by making an edge map image using an edge detecting filter on the entire original image.

It is preferred that each of the image signal components for the picture elements representing the edge portion be corrected to the value for the picture element which is adjacent to the edge portion on the side nearer to the position in which said value is interpolated.

The apparatus for image filtering of the present invention comprises an interpolation processing means for carrying out picture element interpolation on a digital image signal obtained by sampling at a predetermined density an image signal representing an original image, wherein the number of image signal components of the digital image signal is increased by interpolating, into the digital image signal, image signal components whose values are obtained on the basis of a predetermined operation using values of all the picture elements within the area covered with a filter and the coefficient of the filter corresponding to each of the picture elements, and is characterized in that when an edge portion exists in the area covered with the filter, the interpolation processing circuit carries out the predetermined operation after the image signal components for the picture elements representing the edge portion are corrected.

The apparatus for image filtering is preferably provided with a detector for detecting the existence of an edge portion. It is preferred that the detector detects the existence of an edge portion by comparing the absolute value of the difference between the values of image signal components for adjacent picture elements in the area covered with the filter with a predetermined threshold value, or by making an edge map image using an edge detecting filter on the entire original image.

It is preferred that the interpolation processing circuit corrects each of the image signal components for the picture elements representing the edge portion to the value for the picture element which is adjacent to the edge portion on the side nearer to the position in which the value is interpolated.

That is, in the method and apparatus of the present invention, when a discontinuous portion or an edge portion exists in the filter size (the area covered with the filter), the number of the picture elements is increased by interpolating values obtained by an operation which is not affected by the edge portion.

In this specification, "the filtering processing" should be interpreted as a processing including a normal filtering processing for obtaining the values of the image signal components for the picture elements originally contained in the digital image signal (the sampling points) and an interpolation processing for obtaining values to be interpolated among the picture elements originally contained in the digital image signal by the similar filtering and interpolating the values.

The predetermined operation is, for instance, convolution integration of the coefficient of the filter and the values of the sampling points.

"Interpolation processing" is a processing in which, for instance, values obtained through the predetermined operation are interpolated into the digital image signal every other picture element and line, thereby increasing the number of image signal components.

An "edge" means a position where the difference between the values of adjacent picture elements is larger than a predetermined value, and an "edge portion" means an area which is on the side of the edge remote from the interpolated point and may comprise one or more picture elements.

In accordance with the present invention, since the interpolation processing is carried out on the basis of the values obtained by use of corrected values of the image signal components for the edge portion, occurrence of ringing can be suppressed as compared with the conventional method where the values of the picture elements in the edge portion are used in convolution operation as they are.

Further by the interpolation processing which can suppress ringing, an image processing which can ensure a high quality image free from artifact can be carried out in image processings such as image density changing or response correction.

BRIEF DESCRIPTION OF THE DRAWINGS

FIG. 3 is a view for illustrating the interpolation processing in accordance with the filtering method of the present invention, FIG. 4 is a view for illustrating the operation of the image filtering apparatus of the embodiment.

DESCRIPTION OF THE PREFERRED EMBODIMENTS

Figure 1:
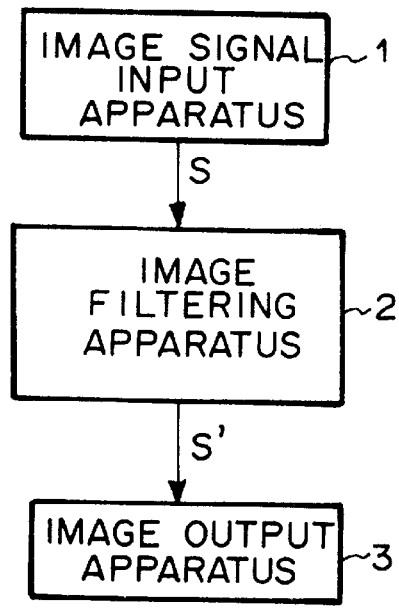
FIG. 1 is a view for briefly illustrating an image filtering apparatus in accordance with an embodiment of the present invention.

In FIG. 1, an image filtering apparatus 2 in accordance with an embodiment of the present invention receives a digital image signal S from an image signal input apparatus 1. The digital image signal S is obtained by sampling an original image signal representing an original image at a predetermined density. The image filtering apparatus 2 carries out an interpolation processing on the digital image signal for increasing the number of image signal components by interpolating, into the digital image signal, image signal components obtained by use of a predetermined filter and a convolution operation and outputs a processed image signal to the image output apparatus 3 as a reproducing image signal S'.

The method of filtering employed in the image filtering apparatus 2 will be described, hereinbelow.

The image signal components for interpolated picture elements are obtained on the basis of the image signal components for the picture elements in the area covered with the filter and convolution integration of the coefficient of the filter corresponding to each of the picture elements. It is assumed that the image signal is made up of image signal components for ten picture elements arranged in a line and a linear filter (size 10) is employed for the purpose of simplicity.

Further it is assumed that the values of the picture elements (image signal components) are in the range of 0 to 1024 and the coefficients of the filter are in the range of K0 to K9. When the values of the original picture elements (sampling points) A0 to A9 (FIGS. 2A and 2B) are represented by a0 to a9, the value b of an interpolated picture element B which is between the original picture elements A4 and A5 is obtained through the following operation.

$$b = \sum_{i=0}^{9} Ki x \langle ai \rangle \quad (2)$$

wherein $$\langle a4 \rangle = a4 \qquad \langle a4 \rangle = a5 \quad (3)$$
$$\langle a3 \rangle = f(a3 - \langle a4 \rangle) + \langle a4 \rangle \qquad \langle a6 \rangle = f(a6 - \langle a5 \rangle) + \langle a5 \rangle$$
$$\langle a2 \rangle = f(a2 - \langle a3 \rangle) + \langle a3 \rangle \qquad \langle a7 \rangle = f(a7 - \langle a6 \rangle) + \langle a6 \rangle$$
$$\langle a1 \rangle = f(a1 - \langle a2 \rangle) + \langle a2 \rangle \qquad \langle a8 \rangle = f(a8 - \langle a7 \rangle) + \langle a7 \rangle$$
$$\langle a0 \rangle = f(a0 - \langle a1 \rangle) + \langle a1 \rangle \qquad \langle a9 \rangle = f(a9 - \langle a8 \rangle) + \langle a8 \rangle$$

$$0(256 \leq x) f(x) = x(-256 < x < 256) 0(x \leq -256) \quad (4)$$

When the range of the values of the picture elements is 0 to 1024, a quarter of the range, 256, is set as a threshold value, and when the difference between adjacent picture elements is not smaller than 256, it is determined that the picture elements are discontinuous, that is, there exists an edge between the adjacent picture elements.

Figure 2A:
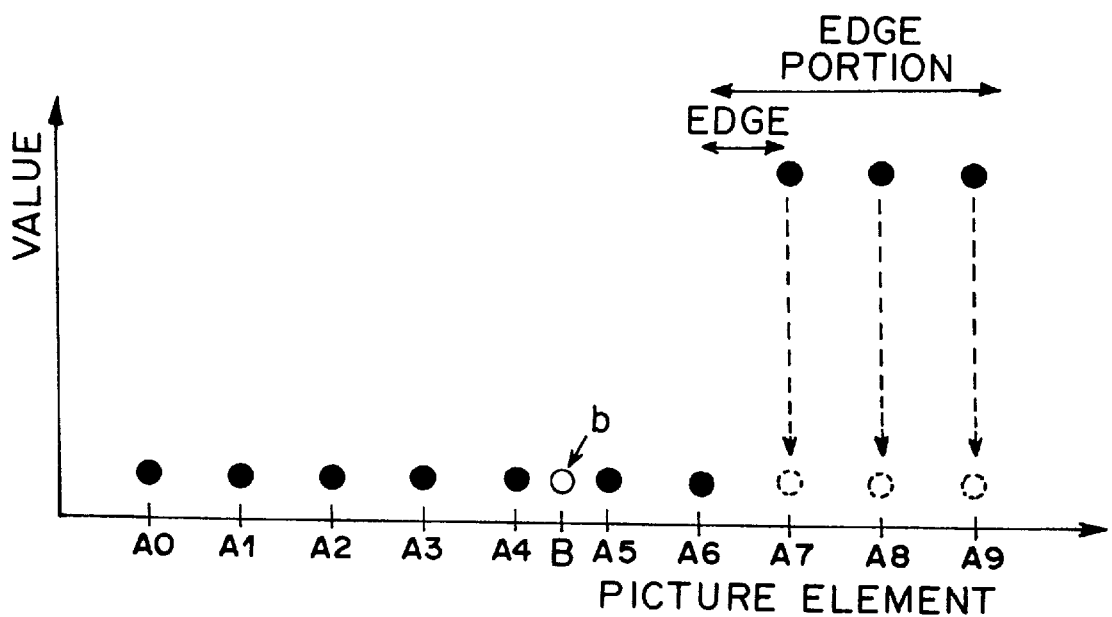
FIGS. 2A and 2B are views for illustrating the interpolation processing in accordance with the filtering method of the present invention in the case where an edge portion exists in the area covered with the filter.
Figure 2B:
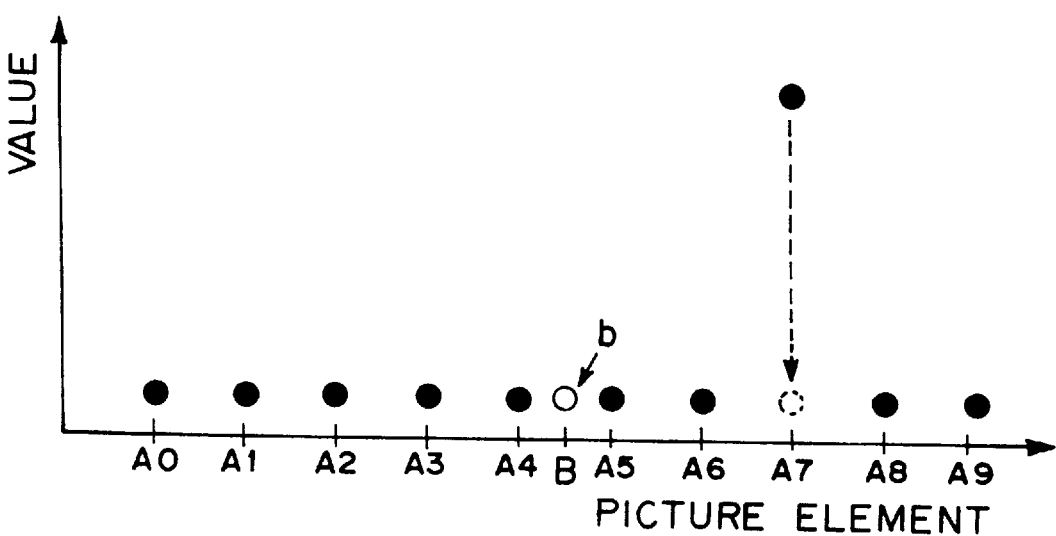
Figure 6A:
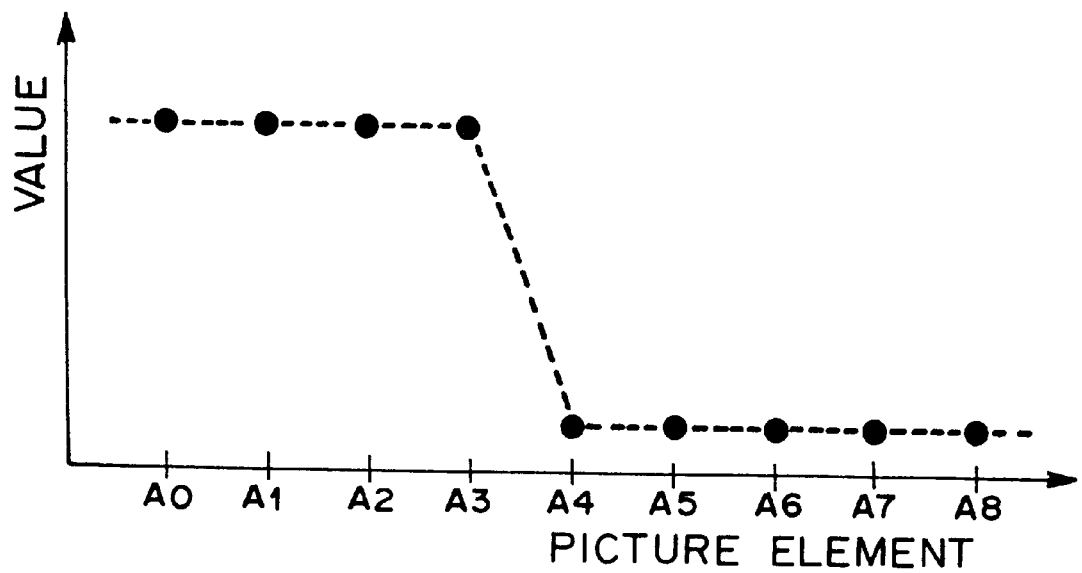
FIGS. 6A and 6B are views for illustrating the interpolation processing by the conventional image filtering processing.
Figure 6B:
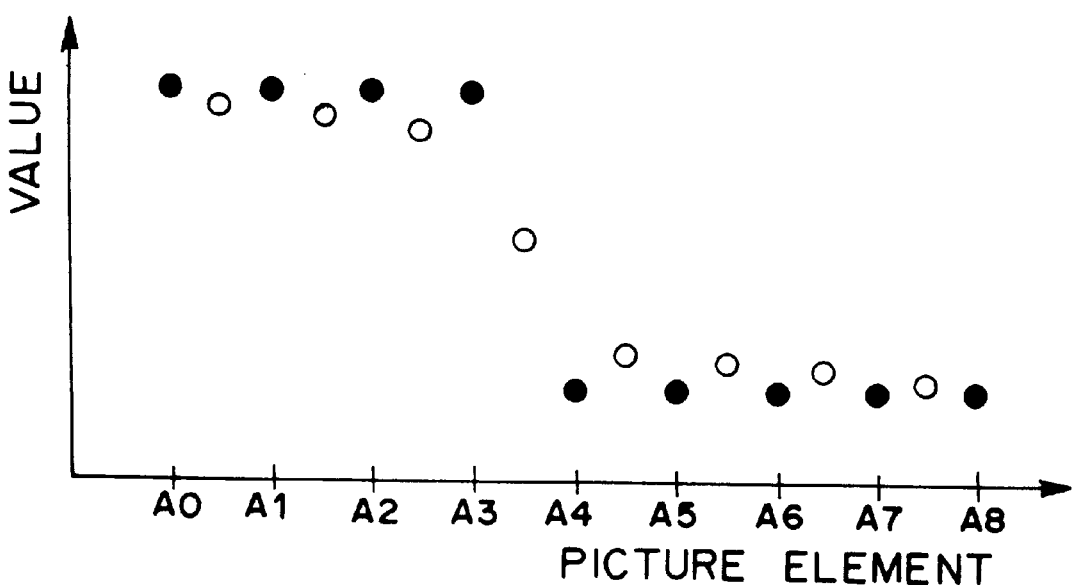

FIG. 2A shows positions of picture elements making up an example of a digital image signal and their values, and FIG. 2B shows positions of picture elements making up another example of a digital image signal and their values. In each of the examples shown in FIGS. 2A and 2B, the difference |a7−a6| between the values of the picture elements A7 and A6 is not smaller than 256, that is, an edge exists between the picture elements A7 and A6, and a picture element B is to be interpolated between the picture elements A4 and A5. In the example shown in FIG. 2A, the values a8 and a9 of the picture elements A8 and A9 are substantially the same as that of the picture element A7. That is, the picture elements A7, A8 and A9 form an edge portion. In the example shown in FIG. 2B, only the picture element A7 forms an edge portion and a such a case appears when a letter or a line is inserted into an image.

In the case of the example shown in FIG. 2A, as for the values <a0> to <a6>, f(x)=x and <ai>=ai according to formulae (3) and (4). Since a7−a6>256, f(x)=0 and <a7>=<a6>=a6. Similarly, <a8>=a6 and <a9>=a6. This is equivalent to substitution of the value a6 of the picture element A6 which is adjacent to the edge on the side nearer to the interpolated point B into the values a7, a8 and a9 of the picture elements A7, A8 and A9 of the edge portion. Convolution integration is carried out on the basis of the values <a0> to <a9> thus obtained according to formula (2) in order to obtain the value b of the interpolated point B. Thus the value b of the interpolated point B is obtained without use of the values of the picture elements of the edge portion.

In the case of the example shown in FIG. 2B, as for the values <a0> to <a7>, <ai>=ai (i=0 to 6) and <a7>=a6 as in the case of the example shown in FIG. 2A. Since a8−<a7> (=a8−a6)<256, <a8>=a8. Similarly, <a9>=a9. Thus the value b of the interpolated point B is obtained without use of the value of the picture element of the edge portion.

When no edge portion exists in the filter size, <ai>=ai (i=0 to 9) in formula (3), which is the same as the result in the conventional operation according to the aforesaid formula (1).

By the filtering processing described above, occurrence of artifact due to ringing near the edge can be suppressed.

Generally convolution according to the aforesaid processing is carried out in sequence in the direction of the main scanning and in the direction of the sub-scanning as shown in FIG. 3. In the case of the example shown in FIG. 3, by carrying out filtering on sampling points of the original image (digital image signal components) represented by Amn (m and n stand for integers representing positions) in FIG. 3 with a filter F, the values of interpolated points Bmn, Cmn and Dmn are obtained. In FIG. 3, only a part of the interpolated points Bmn, Cmn and Dmn is shown for the purpose of facilitating understanding. Bm4, C44 and D44 in FIG. 3 are obtained by carrying out operations according to formulae (a), (b) and (c).

FIG. 4 shows a concrete processing carried out by the image filtering apparatus 2 which carries out the interpolation processing using the filter F shown in FIG. 3. The digital signal components for the respective picture elements A01 to A09, A10 to A19 . . . of the digital image signal S to be processed are input into the image filtering apparatus 2 scanning line by scanning line in this order. The image filtering apparatus 2 calculates Bmn on the basis of the digital image signal components for the last ten picture elements out of the signal components input into the image filtering apparatus 2 in sequence and outputs to buffers in sequence each allotted to one line. The capacity of the buffer is such that digital image signal components for picture elements twice as many as the picture elements in one scanning line, that is, digital image signal components for twenty picture elements in this particular embodiment, can be stored therein. The values Bmn which are obtained in sequence in the manner described above and output to the buffers and the values Amn for the original picture elements alternate with each other in this example.

When the buffers for 10 scanning lines are filled, the image filtering apparatus 2 obtains Cmn and Dmn on the basis of digital image signal components stored in the corresponding positions of the buffers, that is, digital image signal components for picture elements on the same column in FIG. 3. The values of the picture elements Amn, Bmn, Cmn and Dmn thus obtained are output in sequence in the scanning line direction. Thereafter the image filtering apparatus 2 clears the image signals in the buffer in which digital image signal components are stored first in the 10 buffers. Then digital image signal components for another line are stored in the buffer and the image filtering apparatus 2 repeats the processing described above.

Though the description has been made using a one-dimensional filter, the filter need not be limited to a one-dimensional filter and the size of the filter and the coefficient of the filter may be selected according to the desired image.

Figure 5:
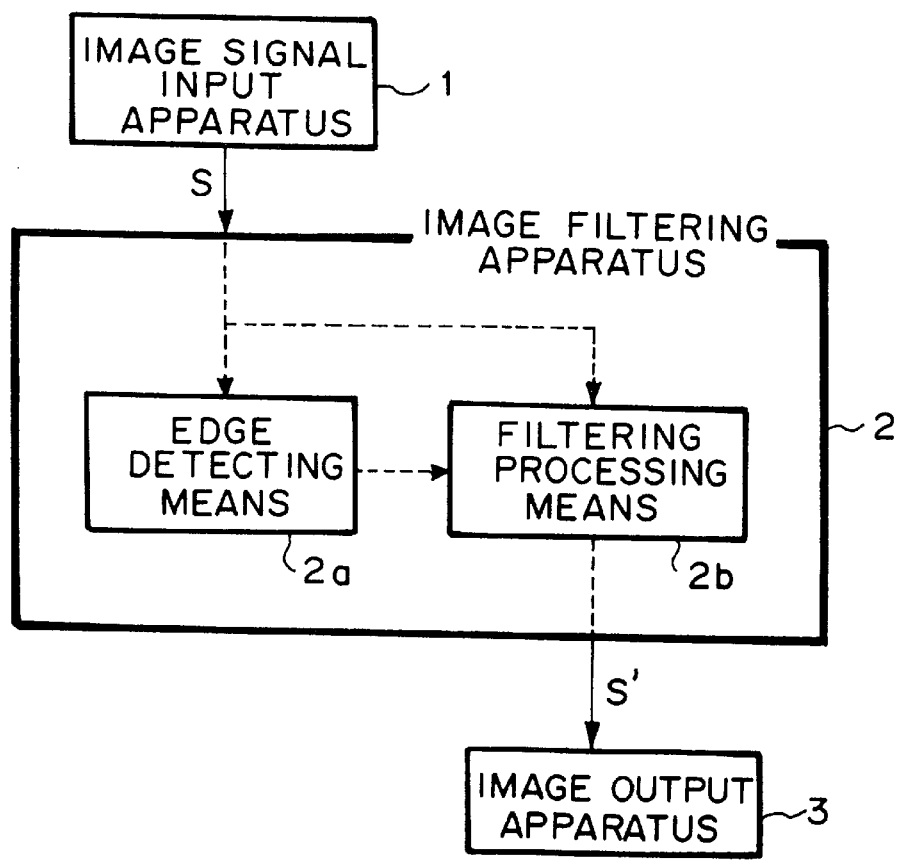
FIG. 5 is a view for illustrating an image filtering apparatus in accordance with another embodiment of the present invention.

Though, in the embodiment described above, existence of an edge is detected on the basis of the difference between the values of adjacent picture elements by use of a function f(x), that is, detection of an edge and convolution operation are simultaneously carried out, an edge detector 2a may be provided in the image filtering apparatus 2 to detect an edge before the convolution operation as shown in FIG. 5. That is, in the image filtering apparatus 2 in accordance with another embodiment of the present invention, the edge detector 2a makes an edge map image by applying an edge detecting filter to the entire image and a filtering processing means 2b carries out a convolution integration assuming that the values of the picture elements on the side of an edge remote from the interpolated point are the same as that of the picture element which is adjacent to the edge on the side of edge nearer to the interpolated point when it is determined that filtering is carried out across the edge according to the edge map image.

The image filtering apparatus of the present invention can be applied in an interpolation processing for enlarging an image (see, for instance, EP 753828 A2) such as when an image for diagnosis or the like taken by a CT or MRI is output to a laser printer or when an image on a negative film or a photographic print is read out by a scanner and output to a printer after processing, or in an picture element density conversion processing (see, for instance, Japanese Unexamined Patent Publication No. 2(1990)-13910 and U.S. Ser. No. 08/823,312), or in a response correcting processing (see, for instance, U.S. Ser. No. 08/406,076). By use of the image filtering apparatus of the present invention, picture element density conversion or response correction can be carried out without generating ringing near an edge of the image.

What is claimed is:

1. A method of image filtering for performing picture element interpolation on a digital image signal obtained by sampling, at a predetermined density, an image signal having image signal components representing an original image, said method comprising:

identifying edge portion image signal components for picture elements representing an edge portion of said image signal;

correcting respective values of said edge portion image signal components for said picture elements representing said edge portion to a value of a picture element adjacent to said edge portion to obtain corrected image signal components;

processing said image signal components for picture elements arranged within said area covered by said filter and said corrected image signal components based upon coefficients of said filter corresponding to each of said image signal components and said corrected image signal components to obtain processed image signal components; and interpolating, into said digital image signal, image signal components having values obtained on the basis of said processed image signal components.

2. A method as defined in claim 1, further comprising detecting whether said edge portion exists in an area of said digital image signal covered by a filter based upon values of said image signal components arranged within said area covered by said filter, wherein said step of detecting said edge portion comprises detecting said edge portion before said interpolating step is performed.

3. A method as defined in claim 2, wherein said step of detecting said edge portion comprises comparing the absolute value of the difference between said values of said image signal components for adjacent picture elements in said area covered by said filter with a predetermined threshold.

4. A method as defined in claim 2, wherein said step of detecting said edge portion comprises determining an edge map image using an edge detecting filter on said original image.

5. A method as defined in claim 1, wherein said correcting step comprises correcting values of each of said edge portion image signal components to said value for said picture element adjacent to said edge portion on a side nearer to a position in which a value is interpolated.

6. An apparatus for image filtering which performs picture element interpolation on a digital image signal obtained by sampling, at a predetermined density, an image signal having image signal components representing an original image, said apparatus comprising:

identifying edge portion image signal components for picture elements representing an edge portion of said image signal;

means for correcting respective values of said edge portion image signal components for said picture elements representing said edge portion to a value of a picture element adjacent to said edge portion to obtain corrected image signal components;

means for processing said image signal components for picture elements arranged within said area covered by said filter and said corrected image signal components based upon coefficients of said filter corresponding to each of said image signal components and said corrected image signal components to obtain processed image signal components; and interpolation processing means for interpolating, into said digital image signal, image signal components having values obtained on the basis of said processed image signal components.

7. An apparatus as defined in claim 6, further comprising means for detecting whether said edge portion exists in an area covered by a filter based upon values of said image signal components arranged within said area covered by said filter.

8. An apparatus as defined in claim 7, wherein said detecting means detects said edge portion by comparing the absolute value of the difference between said values of image signal components for adjacent picture elements in said area covered by said filter with a predetermined threshold.

9. An apparatus as defined in claim 7, wherein said detecting means comprises an edge detecting filter, wherein said detecting means detects said edge portion by determining an edge map image using said edge detecting filter on said original image.

10. An apparatus for image filtering as defined in claim 6, wherein said interpolation processing means corrects each of said image signal components for the picture elements representing said edge portion to said value for said picture element which is adjacent to said edge portion on a side nearer to a position in which a value is interpolated.

* * * * *